US006216975B1

(12) United States Patent
Schaub

(10) Patent No.: US 6,216,975 B1
(45) Date of Patent: Apr. 17, 2001

(54) PROCESSING ARRANGEMENT FOR ROLLED UP MATERIAL

(75) Inventor: Heinrich Schaub, Wettingen (CH)

(73) Assignee: Gretag Imaging AG, Regensdorf (CH)

( * ) Notice: Subject to any disclaimer, the term of this patent is extended or adjusted under 35 U.S.C. 154(b) by 0 days.

(21) Appl. No.: 09/384,221

(22) Filed: Aug. 27, 1999

(30) Foreign Application Priority Data

Aug. 27, 1998 (EP) ........................................ 98116162

(51) Int. Cl.[7] ........................................ B65H 19/22

(52) U.S. Cl. ........................ 242/525.4; 242/533.4; 242/538.2; 242/559.2

(58) Field of Search ..................... 242/525.4, 533.4, 242/533.5, 538, 538.1, 538.2, 559.2; 396/642

(56) References Cited

U.S. PATENT DOCUMENTS 4,138,073 2/1979 Dowd .

FOREIGN PATENT DOCUMENTS 0 543 069 A1 5/1993 (EP) .
2 128 593 5/1984 (GB) .

*Primary Examiner*—John Q. Nguyen
(74) *Attorney, Agent, or Firm*—Burns, Doane, Swecker & Mathis, LLP

(57) ABSTRACT

A processing arrangement for web shaped material (M) wound onto reels before and after processing includes a processing station (B) for the material, associated transport mechanism (T) for transporting the material through the processing station, an unwind arrangement (U) for the automatic feeding of material to be processed from on an unwind reel (S) located in an unwind position (pU) to the processing station, a windup arrangement (W) for the automatic feeding and winding up of processed material leaving the processing station onto a windup reel (S) located in a windup position (pW), and a common reel carousel (K) for receiving at least three windup reels (S) and unwind reels (S). The reel carousel transports the reels (3) removably mounted thereon cyclically and stepwise into the unwind position (pU), the windup position (pW) and at least one exchange position (pR) so that an unwind reel (S) emptied after unwinding of the material to be processed (M) after its further transport into the windup position (pW) can take over the role of a windup reel (S) and that in the at least one exchange position (pR) a windup reel (S) containing processed material can be removed from the reel carousel (K) and replaced with a new unwind reel (S) containing material to be processed. The processing arrangement is especially suited for the treatment or processing of photographic rolled up material and facilitates and simplifies the operation in that the exchange of the material reel is possible in one operation step and at one location of the processing arrangement.

11 Claims, 3 Drawing Sheets

S
S
pU
23a
1
M
2
1
2
17
$B_1$
3
$B_2$
25
S
pR
1
19
2
M
M
25
21
K
pW

K
2
23a
S
M
2
17
3
$B_1$
$B_2$
25
S
S
19
21
25

K
23a
18
11
12
13
S
S
2
S
2
24
17
$B_1$
3
20
$B_2$
22
25
19
S
25
16
15
14
21

PROCESSING ARRANGEMENT FOR ROLLED UP MATERIAL

BACKGROUND OF THE INVENTION

1. Field of the Invention

The invention relates to a processing arrangement for web shaped material rolled onto reel before and after processing. More particularly, the invention relates to a processing arrangement for photographic rolled up material, for example a photoelectric scanner for developed photographic films (film scanner).

2. Background Information

In photographic film laboratories, it is common to splice together films which are to be processed to long film webs and to wind these webs onto suited reels to form rolls. The film material is fed to the processing arrangement, for example, a photographic printer, in rolled up form and is after processing once again wound up in the form of a roll.

The processing of the material is thus carried out by roll (batch wise), whereby the normally continuous treatment process must be interrupted more or less long during the change of the film rolls or reels at the input or output side of the processing arrangement. In order to keep these system based interruptions as short as possible, which are especially annoying in modern high performance photo laboratories, very powerful unwind and windup arrangements have already been developed which guide the film contained on an unwind roll fully automatically to the input of a respective processing station and fully automatically guide the film leaving the processing station to an empty windup roll and wind it thereonto. A further reduction of the interruption times has been achieved with the use of so called reel carousels. These reel carousels have two or more receiving stations for full or empty film reels and transport those reel receiving stations, and thus the film reels therein, sequentially into a working position and one or more exchange positions. While the unwind roll is in the working position and the film material thereon is fed to the processing station, the empty film reel at the exchange station can be replaced with a new unwind roll containing film material to be processed. Analogously, while a windup reel is in the working position and takes up processed film material coming from the processing station, a full reel at the receiving station in exchange position can be replaced with a new, empty windup reel. A high performance printer equipped at the input and output sides with such reel carousels and fully automatic unwind or windup arrangements is disclosed, for example, in U.S. Pat. No. 5,337,118 (corresponding to EP-B-0 543 069).

The apparatus cost for such reel carousels is relatively high. Furthermore, with the mentioned known high performance printer, the operator must change the film reels in two separate steps at two spatially separate locations of the printer.

SUMMARY OF THE INVENTION

It is now an object of the present invention to improve a processing arrangement of the generic type so that the apparatus cost is reduced and the handling simplified and facilitated.

This object is achieved in accordance with the invention in a processing arrangement for web shaped material which is before and after processing wound onto reels, especially developed photographic rolled up material, with a processing Station for the material and corresponding transporting means for transporting the material through the processing station, with an unwind arrangement for the automatic feeding to the processing station of material to be processed and located on an unwind reel positioned in an unwind position, and with a windup arrangement for automatically guiding and winding processed material exiting the processing station onto a windup reel positioned in a windup position, whereby a common reel carousel is provided which is adapted for receiving at least three reels.

According to the main idea of the invention, only one single, common reel carousel for windup and unwind reels is used. The constructive cost is thereby reduced and the operation of the arrangement is facilitated and simplified in that the reel exchange need only be carried out at one location of the arrangement and in only one step of operation.

A further important aspect is that the common reel carousel supports two pairs of wind-up and unwind reels meaning that it is then possible to process different film formats, as a certain number of different film formats require this certain number of pairs of wind-up and unwind reels so as to be automatically processed. For instance, two film formats require two of said pairs, where as if there were only three reels, it would be necessary for an operator to interfere manually in order to change the wind-up and unwind process from one film format to another.

BRIEF DESCRIPTION OF THE DRAWINGS

Further advantageous and especially expedient embodiments of the processing arrangement in accordance with the invention will be described in the following and with reference to the drawings, wherein.

DETAILED DESCRIPTION OF THE INVENTION

The first preferred embodiment of the processing arrangement includes an essentially triple space reel carousel K for receiving windup and unwind reels S for material to be processed or already processed material M, a processing station B for the web shaped material to be processed, a fully automatic unwind arrangement U and an equally fully automatic windup arrangement W. The processing station B further includes transporting means for taking up the web shaped M material to be processed from the unwind arrangement U, transporting it through the processing station B, and passing it to the windup arrangement W.

The motor driven, rotatable reel carousel K is can be locked in three discrete positions of rotation mutually spaced at 120°, which define three different working positions, an unwind position pU, a windup position pW, and a exchange position pR, into which each of the reefs S positioned on the reel carousel K is moved sequentially by rotation of the latter. The unwind arrangement U feeds the material M to be processed on the reel S respectively positioned in the unwind position pU and in that function referred to as unwind reel, to the input of the processing station B and passes it to the transport means T thereof; the processed material is passed on by the transport means T at the output of the processing station B to the windup arrangement W which feeds it to the reel S respectively located in the windup position pW and referred to in that function as windup reel, and winds it thereonto.

In the exchange position pR, a reel wound with processed material M can be removed and respectively replaced with a new reel containing material to be processed.

In the processing station B, the web shaped material M is treated or processed in the desired manner. For example, the processing station can include one or more treatment units. In the case of processing of photographic film material, the processing station is typically constructed as a photo-electric scanner and/or as a notcher. Of course, the processing station can also be constructed as a (conventional or digital) exposure arrangement, so that the processing arrangement then overall represents a photographic printer. The processing of the material M or the processing station B itself are not part of the present invention and thus need not be further discussed. The processing arrangement in accordance with the invention is also not limited to applications in the photographic field, but can of course also be used for the processing of any other type of rolled up material.

Figure 1:
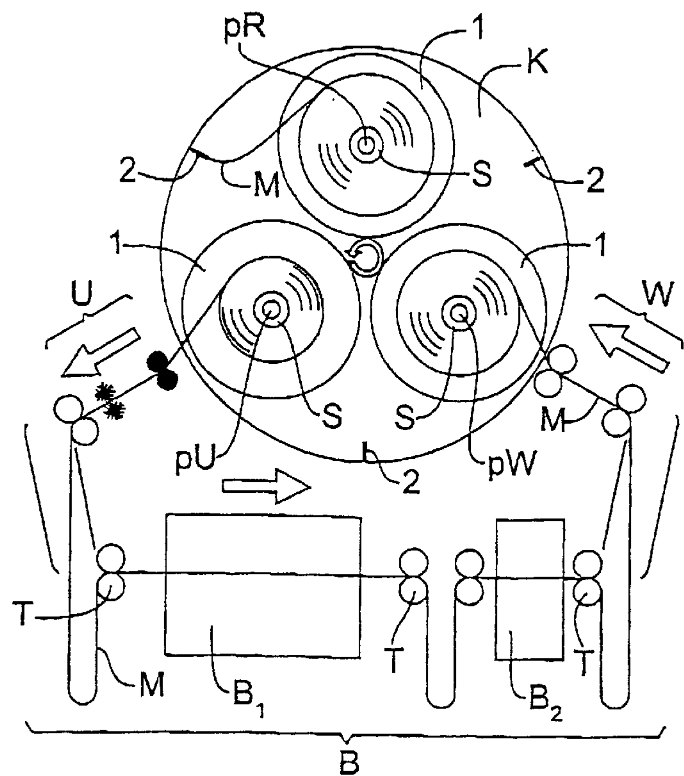
FIG. 1 shows a schematic view of a first preferred embodiment of the processing arrangement in accordance with the invention with a triple reel carousel.
Figure 2:
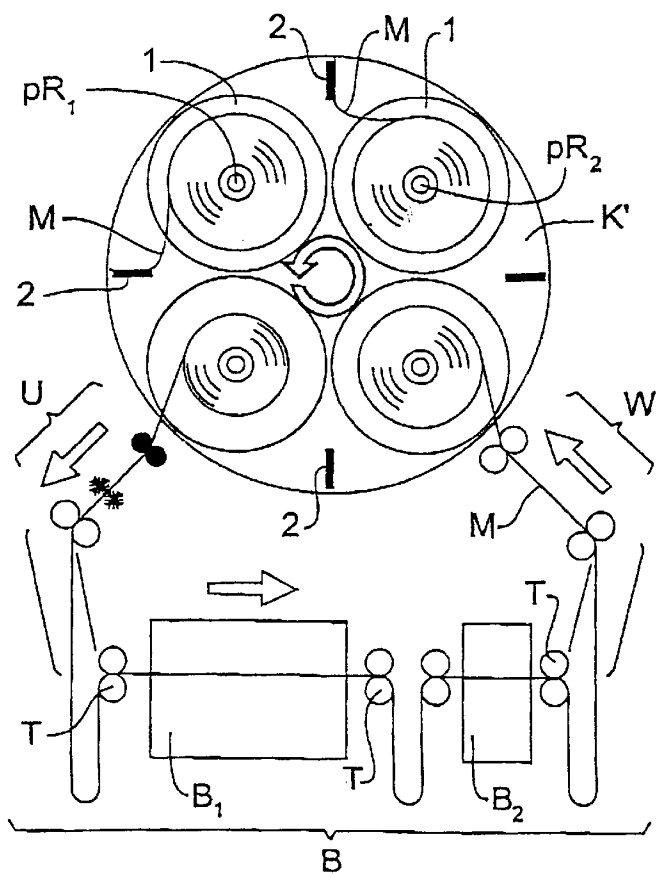
FIG. 2 is a schematic view of a second preferred embodiment of the processing arrangement in accordance with the invention with a quadruple reel carousel.

The embodiment in accordance with the invention illustrated in FIG. 2 is distinguished from the first embodiment only in that the reel carousel K' is equipped with four instead of three receiving locations for reels S and correspondingly includes four discrete, evenly spaced rotational positions which respectively define an unwind position pU, a windup position pW, and two adjacent exchange positions pR1 and pR2. The additionally available second exchange position allows a more flexible operation during reel exchange.

The embodiment of FIG. 2 is capable of dealing with two different film formats without the help of an operator. For instance, when the lower pair of reels is busy winding up and unwinding a first film format, the upper pair of reels can be equipped with another film format. Accordingly, when the first film of the lower pair of reels has been processed, the upper pair can be brought in the active position, and the film, having a format different to that of the first format, can be processed.

Of course, for special applications, the processing arrangement could also be equipped with a reel carousel which includes more than four reel receiving stations. However, a further increase in the number of reel receiving stations generally does not provide substantial additional advantages.

The function of the processing arrangement will now be described in the following with reference to FIGS. 3 to 8 and regarding an example of a three-station reel carousel. The explanations apply analogously to the embodiment with a four-station reel carousel.

Figure 3:
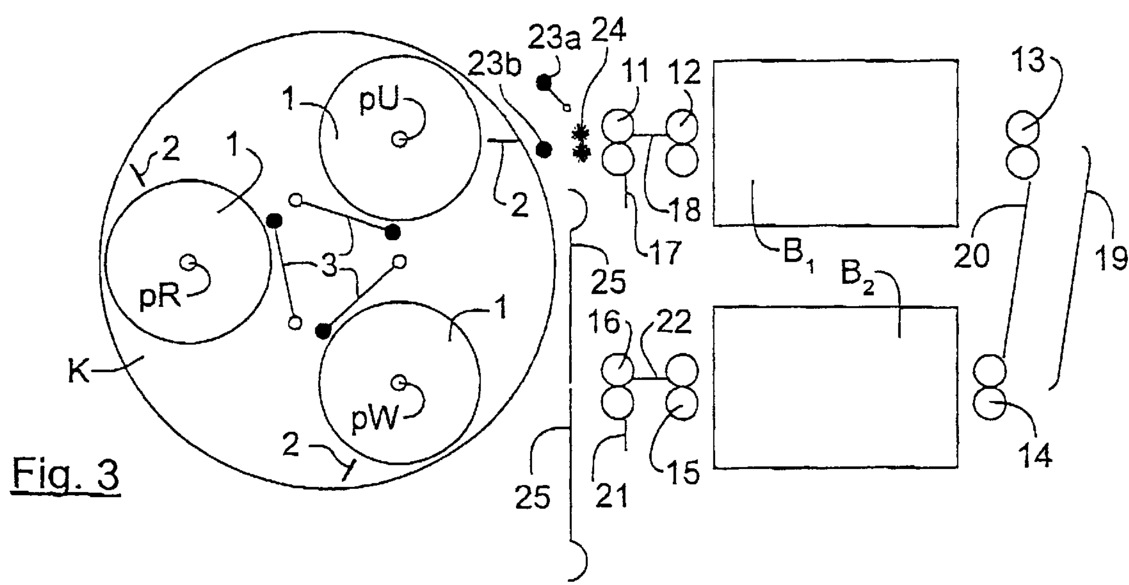
FIGS. 3 to 8 are schematic sketches for the illustration of various apparatus details as well as the function of the processing arrangement in accordance with the invention.

FIG. 3 shows the arrangement in the basic condition wherein the reel carousel does not yet include any reels. The exchange position, the unwind position and the windup position of the reels are respectively identified with the points pR, pU and pW.

On the reel carousel are apparent three reel receiving stations 1, three electrically operated clamping arrangements 2 respectively associated with a reel receiving station for the start of the rolled up material found on the unwind reel, and three also electrically operated holding arrangements 3 respectively associated with a reel receiving station for the uppermost wound layer of the rolled up material on the windup reel. As described in detail, for example, in the aforementioned U.S. Pat. No. 5,337,118, a reel S empty or wound with roll material can be removably mounted in each reel receiving station 1. The clamping arrangements 2 consist, for example, of two spring loaded mutually forced together jaws which can be electrically opened. As described in detail, for example, in the aforementioned U.S. Pat. No. 5,337,118, the holding arrangements 3 consist of a pivotable lever which can be electrically moved to and fro and is provided at its free end with a pressure roller. The control of the drive motors for the reels S, the clamping arrangements 2 and the holding arrangements 3 as well as the drive motor (not illustrated) for the reel carousel itself is achieved conventionally and by way of an accordingly programmed digital control.

The processing station here includes, for example, a scanning arrangement B1 and a notcher arrangement B2. The means for transporting the material through the processing station are indicated by electrically driven transport roller pairs 11 to 16 as well as by stationary, electrically movable guide flaps 17 to 22. The transport roller pairs and the guide flaps are driven and controlled in conventional manner by way of step motors and by rotating or lifting magnets and an accordingly programmed digital control. The two transport roller pairs 11 and 12 at the input together with the guide flaps 17 and 18 on the one hand and the transport roller pairs 15 and 16 together with the guide flaps 21 and 22 on the other hand respectively form in commonly known manner an input and output loop module which mechanically uncouples the processing station from the reel carousel. Analogously, the transport roller pairs 13 and 14 together with the guide flaps 19 and 20 form another loop module which mechanically uncouples the two processing units B1 and B2 within the processing station. Loop modules of this type are commonly known and described in detail, for example, in the aforementioned U.S. Pat. No. 5,337,118 (corresponding to EP-B-0 543 069).

The unwind arrangement connecting the reel carousel K with the input of the processing station consists essentially of a motor driven roller pair 23*a*/23*b* and a roller pair 24 constructed as a rotating pair of brushes for the cleaning of the film, whereby the roller 23*a* is movable (pivotable) so that it can be engaged with or disengaged from the roller 23*b*. The drive and adjustment of the rollers is carried out conventionally by way of not illustrated drive motors in connection with an accordingly programed digital control.

The windup arrangement connecting the processing station with the reel carousel K consists essentially of a pair of motor driven openable and closable tongs shaped as guide spoons 25, which in the closed condition define a guide channel therebetween that guides the treated roll material to the windup core of an empty windup reel in the windup position so that it catches on the core and is wound up. The drive and adjustment of the guide spoons 25 is achieved conventionally by way of not illustrated drive motors or magnets in connection with an accordingly programed digital control. The exact construction and function of the windup reel is also described in detail, for example, in the aforementioned U.S. Pat. No. 5,337,118 and, thus, need not be described any further.

Figure 4:
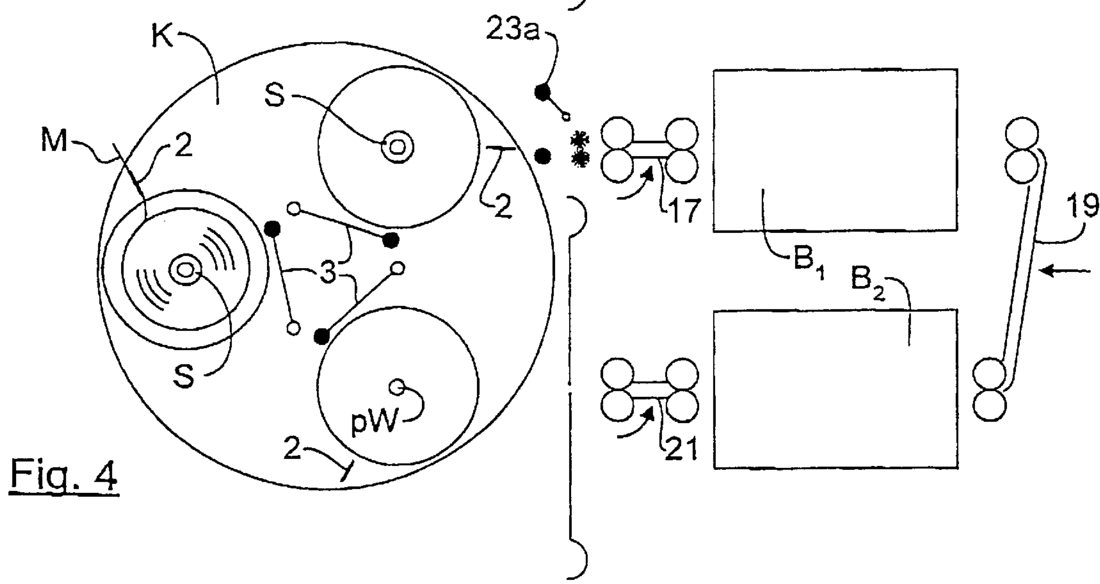
Figure 5:
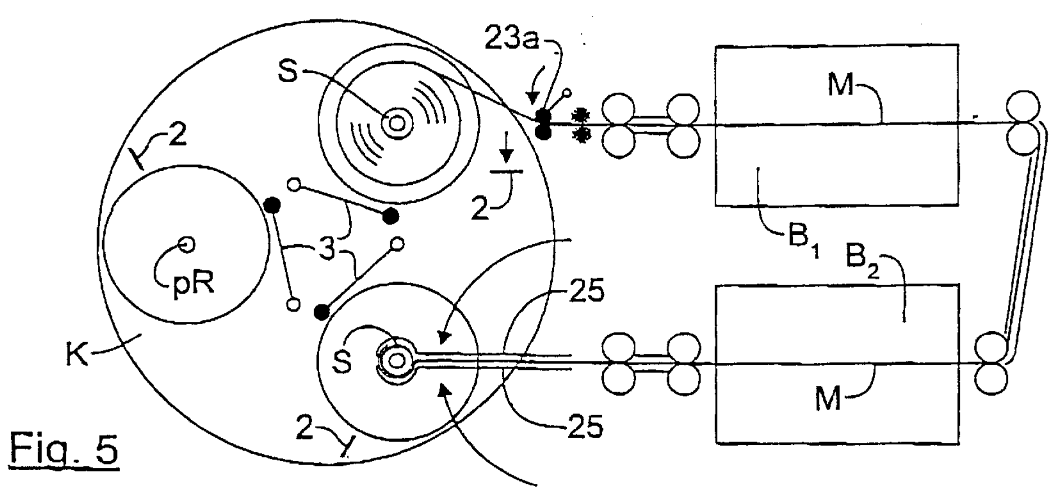

In the basic or starting position of the arrangement illustrated in FIG. 3, an empty reel S is mounted to the reel receiving station positioned in the exchange position pR and the reel carousel rotated one step into the rotation position indicated in FIG. 4 so that the empty reel is positioned in the unwind position pU. The movable guide flaps 17, 19, and 21 are then moved towards the respectively associated stationary guide flaps 18, 20, and 22, in order to pair wise define guide channels. The two rollers 23*a* and 23*b* are spaced apart from one another.

A (full) reel S with material to be processed is now mounted in the exchange position pR and the beginning of the material web fastened to the associated clamping arrangement 2, so that a small piece of material web protrudes from the clamping arrangement. The reel carousel is then rotated one step into the rotation position illustrated in FIG. 5 wherein the full reel S is located in the unwind position pU and the empty reel S is located in the windup position pW. The starting piece of the web material protruding from the clamping arrangement 2 thereby engages roller 23*a*. Roller 23*a* is now moved towards roller 23*b* so that the pair of rollers 23*a*/23*b* grab the start of the material web, and the clamping arrangement 2 is simultaneously opened. Furthermore, the guide spoons 25 are closed about the empty reel S located in the windup position pW. The unwind arrangement consisting of the two roller pairs 23*a*/23*b* and 24 now pulls the roll material off the unwind reel S and guides it to the transport means formed by the transport roller pairs 11–16 and the guide plates 17–22. They transport the material through the processing station and pass it at the output to the windup arrangement formed by the guide spoons 25 which in turn guides the material to the windup reel S in the windup position pW.

Figure 6:
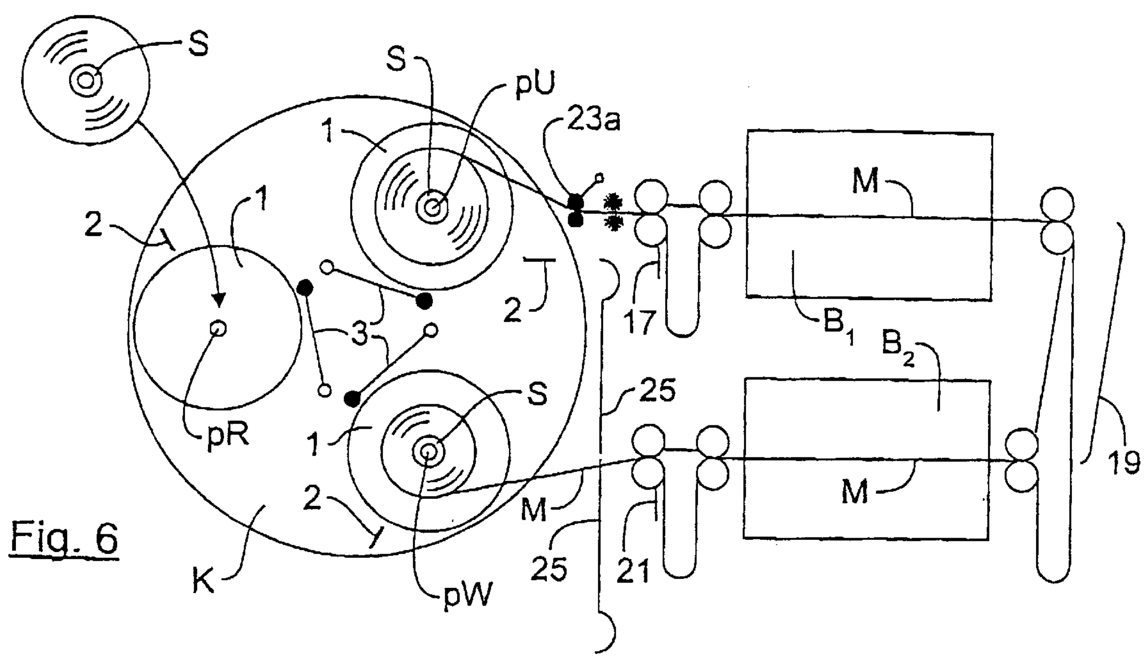

At the same time or immediately thereafter, the guide spoons 25 are opened again and the guide flaps 17, 19, and 21 are moved away from the stationary guide flaps, 20, and 22 and three decoupling loops are formed in the material web in a manner known in the art (FIG. 6).

While the material M runs through the processing station, the reel receiving station 1 located in the exchange position pR is loaded with a new reel of material to be processed.

Figure 7:
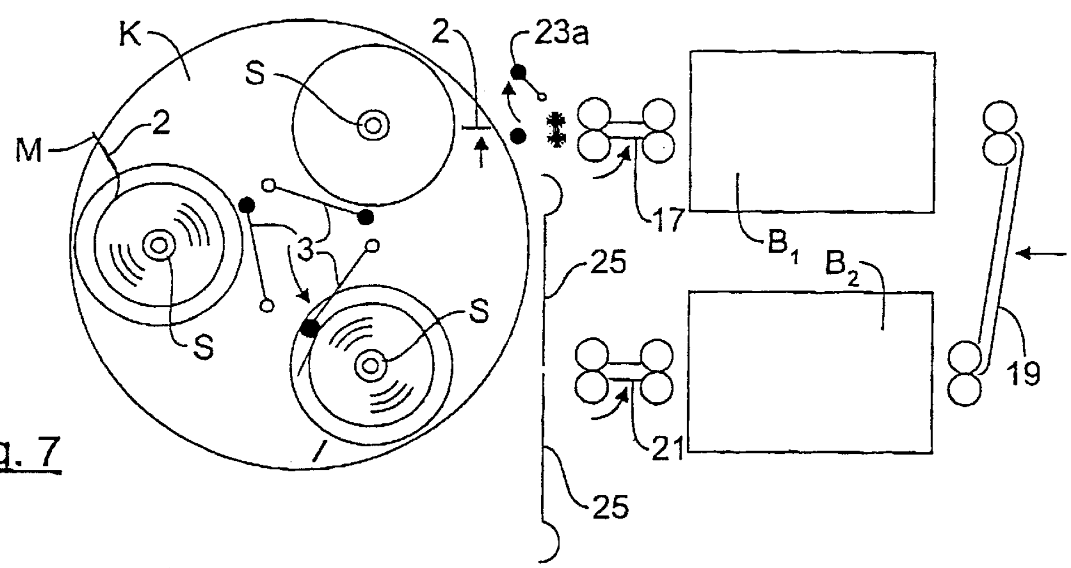

When the unwind reel in the unwind position pU is empty, and the whole material has passed through the processing station and is wound on the windup reel (detectable by appropriate, not illustrated material web sensors) the holding arrangement 3 in the windup position pW is activated so that the wound up material cannot loosen by itself. At the same time, the guide flaps 17, 19 and 21 as well as the roller 23*a* are returned to their base positions (FIG. 7).

Figure 8:
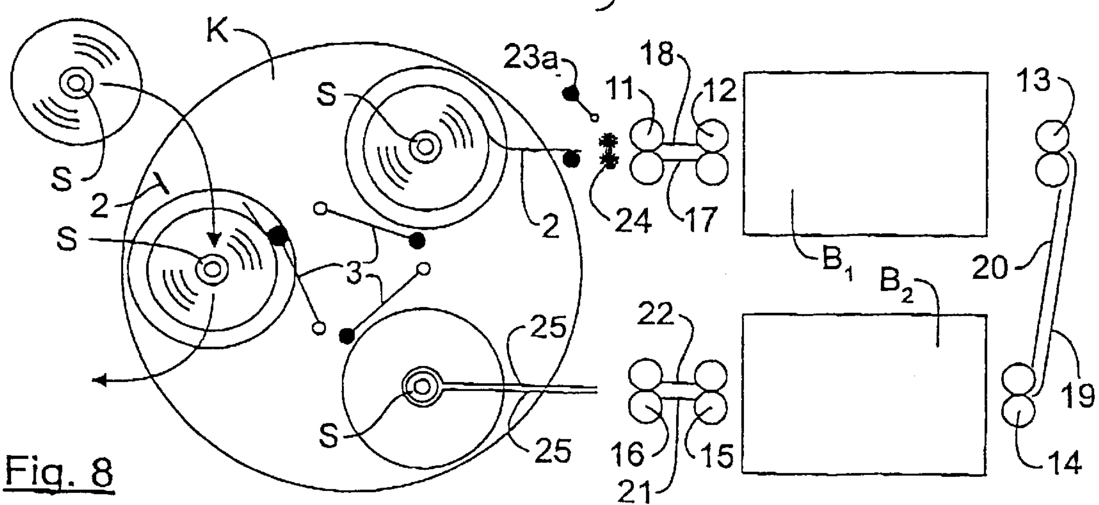

The reel carousel is now turned one step further so that the full windup reel is moved into the exchange position pR, the empty unwind reel is moved into the windup position pW, and the reel containing new material to be processed is moved to the unwind position pU (FIG. 8). The situation now corresponds to the one illustrated in FIG. 5, and exactly the same occurs again as described in connection with FIG. 5. The only difference existing in that the exchange position is now no longer empty but includes a reel full with already processed material. Now commences a new working cycle according to FIGS. 5–8, whereby the reel with the processed material is removed from the reel carousel and replaced with a new reel containing material to be processed.

As is apparent from the above description, an empty reel need only be loaded all the way at the beginning of the very first working cycle while during the following working cycles the respectively emptied unwind reel takes over the role of the windup reel, and the operation of the arrangement is limited to the exchange of a reel full with processed material with a new reel of material to be processed.

The invention is not limited to the recording of picture information originating in a film scanner. It is for instance also possible, as the picture information to be recorded, to use picture data originating from other sources, for instance other scanners, or graphic data on graphics generated by computers, and so forth. The recording apparatus according to the invention may also be embodied and used as a photocopier. The picture information may also be furnished to the computer 300 by means of an arbitrary data carrier medium, as long as the recorder is designed to read that medium. Hence, the recording apparatus according to the invention can also be embodied as an image output device for a computer, where the term "image" should be understood in its broadest sense, or in other words includes any optical information.

It will be appreciated by those skilled in the art that the present invention can be embodied in other specific forms without departing from the spirit or essential characteristics thereof. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. A processing arrangement for processing web-shaped material which is wound onto reels before and after processing, said arrangement comprising:

a processing station for processing the material;

a transport means for transporting the material through the processing station;

an unwind arrangement including an unwind reel for automatically feeding material to be processed from an unwind reel positioned in an unwind position;

a windup arrangement including a windup reel for automatically guiding and winding up processed material, exiting the processing station, onto a windup reel positioned in a windup position; and a common reel carousel for receiving at least three reels including the windup reel and the unwind reel wherein the reel carousel cyclically in a stepwise manner transports reels which are removably mounted onto the carousel into each of the unwind position, the windup position and an exchange position; wherein further the unwind reel is emptied after unwinding of the material for processing and the unwind reel is transported into the windup position to function as a windup reel; and the windup reel containing processed material is transported to the exchange position and removed from the reel carousel and replaced with a new unwind reel containing material to be processed.

2. Arrangement according to claim 1, wherein two pairs of windup and unwind reels are mounted in the processing arrangement.

3. Arrangement according to claim 1, wherein the processing station comprises a photo-electric scanner.

4. Arrangement according to claim 1, wherein the processing station comprises a notcher.

5. Arrangement according to claim 1, wherein the reel carousel includes electric drive means for the reels mounted thereon.

6. Arrangement according to claim 5, wherein the reel carousel includes electrically operated holding means for an uppermost layer of the processed material wound onto the reels.

7. Arrangement according to claim 1, wherein the reel carousel includes electrically operated holding means for an uppermost layer of the processed material wound onto the reels.

8. Arrangement according to claim 1, wherein the reel carousel includes electrically releasable clamping means for the material to be processed on the reels.

9. Arrangement according to claim 1, wherein the web-shaped material is developed photographic material.

10. Arrangement according to claim 9, wherein the processing station comprises a notcher.

11. Arrangement according to claim 9, wherein the processing station comprises a photo-electric scanner.

* * * * *